March 26, 1968   M. J. COOK ET AL   3,375,431

BATTERY CHARGING SYSTEMS FOR ROAD VEHICLES

Filed Feb. 16, 1965

United States Patent Office 3,375,431
Patented Mar. 26, 1968

3,375,431
BATTERY CHARGING SYSTEMS FOR
ROAD VEHICLES
Morris Jackson Cook, Redditch, and John William Herbert Freeman, Coventry, England, assignors to Joseph Lucas (Industries) Limited, Birmingham, England
Filed Feb. 16, 1965, Ser. No. 433,022
Claims priority, application Great Britain,
Feb. 28, 1964, 8,339/64
11 Claims. (Cl. 322—25)

ABSTRACT OF THE DISCLOSURE

In a battery charging system a generator charges the battery and a voltage regulator limits the output voltage of the generator by opening a pair of contacts in series with the generator field winding whenever the output voltage of the generator exceeds a predetermined value. In order to increase contact life, a Zener diode or clipper diode is connected across the field winding or the contacts to limit the voltage developed across the contacts.

---

This invention relates to battery charging systems for road vehicles.

In its broadest aspect, the invention resides in a battery charging system including a generator for charging the battery and a voltage regulator for limiting the output voltage of the generator by opening a pair of contacts in series with the generator field winding whenever the output voltage of the generator exceeds a predetermined value, the system further including a semi-conductor device which will conduct only when the voltage across it exceeds a predetermined value, said device being connected in the system in a position in which it limits the voltage developed across the pair of contacts.

More particularly, a system according to the invention comprises in combination a generator having an earth terminal, a live terminal and a field terminal, the armature being connected between the live and earth terminals and the field winding being connected between the field and earth terminals, and a voltage regulator having a first terminal connected to the live terminal, a second terminal connected to the field terminal, a third terminal which in use is earthed through the battery, a fourth terminal which in use is earthed, a normally closed pair of contacts through which the first and second terminals are interconnected and a coil connected in a series circuit between the first and fourth terminals, said coils opening the pair of contacts when the output voltage of the generator exceeds a predetermined value, the system further including a semi-conductor device which will conduct only when the voltage across it exceeds a predetermined value, said device being connected in the system in a position in which it limits the voltage developed across the pair of contacts.

The generator can be a dynamo, or an alternator having a rectifier associated therewith. Furthermore, the invention resides in a generator and a voltage regulator for use in a battery charging system.

Figure 1:
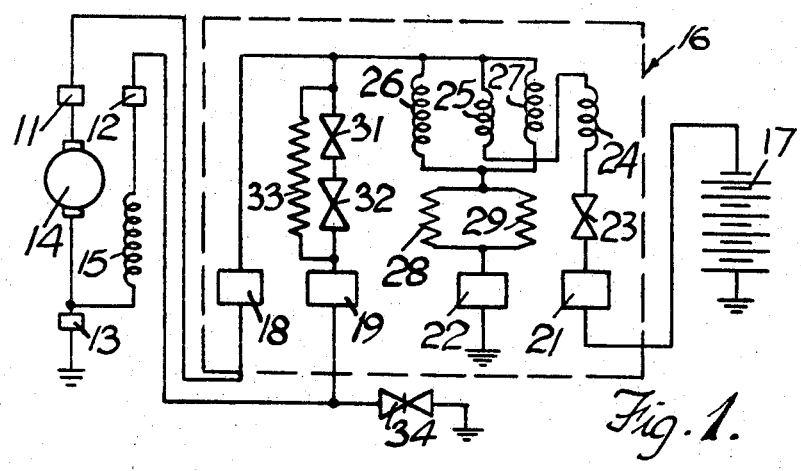
Figure 2:
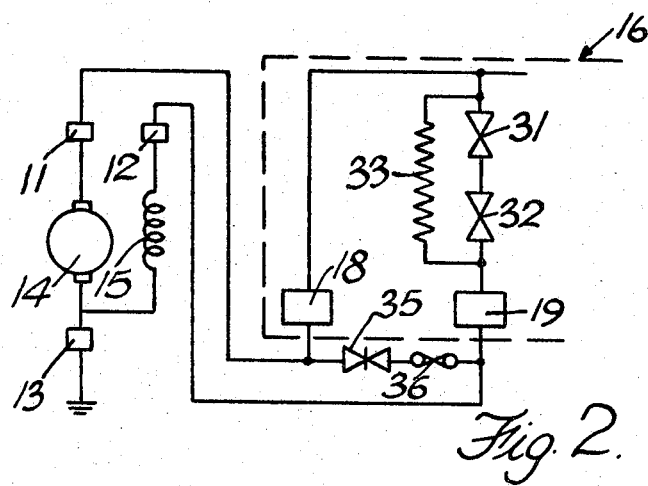

In the accompanying drawings, FIGURE 1 is a circuit diagram illustrating one example of the invention, and FIGURE 2 is a fragmentary view illustrating a modification of part of FIGURE 1.

Referring to FIGURE 1, there is shown a generator having a live terminal 11, a field terminal 12 and an earth terminal 13, the armature 14 being connected between the terminals 11, 13 and the field winding 15 being connected between the terminals 12, 13. The generator can be a dynamo, or an alternator having a rectifier associated therewith so that direct current appears between the terminals 11, 13.

The generator supplies power through a combined voltage and current regulator 16 to a battery 17 which in the example shown has its positive terminal earthed. The regulator 16 includes a first terminal 18 connected to the terminal 11, a second terminal 19 connected to the terminal 12, a third terminal 21 connected to the negative battery terminal, and a fourth terminal 22 which is earthed.

The terminal 21 is connected to the terminal 18 through a series circuit including a first pair of contacts 23 which are normally open, and first and second coils 24, 25. Moreover, the terminal 18 is connected to one end of each of third and fourth coils 26, 27, the other ends of which are interconnected and connected to the terminal 22 through a pair of resistors 28, 29 in parallel. The terminals 18, 19 are interconnected through second and third pairs of contacts 31, 32 connected in series, these contacts each being normally closed and bridged by a resistor 33.

In operation the contacts 23 prevent the battery 17 from discharging into the generator. When the generator starts, as soon as its voltage reaches a predetermined value the voltage developed across the coil 27 closes the contacts 23 so that current flows through the first coil to the battery. The coil 24 is wound on the same core as the coil 27 and assists the operation thereof.

Current also flows to the field winding 15 through the second and third pairs of contacts 31, 32 in series. However, if the output voltage of the generator rises above a predetermined value the voltage developed across the coil 26 opens the contacts 32. Similarly, if the output current rises above a predetermined value, the current flowing in the coil 25 opens the contacts 31. In either case, the generator output falls.

If the battery 17 commences to discharge into the generator, the winding 24 will oppose the action of the winding 27, so that the generator output voltage at which the contacts 23 open is reduced.

At the instant when either the contacts 31 or the contacts 32 open, a high back E.M.F. is induced by virtue of the inductance of the winding 15, and this back E.M.F. tends to cause arcing across the contacts. Such arcing materially reduces the life of the contacts, and the resistor 33 is included to reduce arcing. It is found, however, that when the field current is high the resistor 33 does not overcome the problem, and in order to reduce arcing still further a clipper diode 34 is connected across the winding 15. The clipper diode is a semi-conductor device which has the properties of two Zener diodes connected back-to-back in series, and it is to be understood that any claims specifying a clipper diode are to be interpreted sufficiently broadly to cover the use of a pair of Zener diodes connected back-to-back in series.

In use, when the back E.M.F. builds up to the breakdown voltage of the diode 34, the diode 34 conducts and conducts any further energy generated by the winding 15. In this way, the voltage developed across the contacts is limited, so that arcing is minimised. It should be noted that the voltage across the contacts which are opening must not be limited too much, or otherwise the contact will not operate properly over a prolonged period. For this reason, it would not be satisfactory to connect a diode across the winding 15 to conduct the back E.M.F.

FIGURE 1 shows the electrical connection of the diode 34 correctly, but not of course its correct physical position. The generator and the voltage regulator are supplied to vehicle manufacturers as separate components and interconnected in the road vehicle. In order to ensure that the diode 34 is correctly connected, it can either be incorporated in the generator connected between the terminals 12, 13, or in the voltage regulator connected between the terminals 19, 22.

In the modification shown in FIGURE 2, a clipper diode 35 is connected in a circuit across the contacts 31, 32 and once again limits the voltage developed across the contacts. A minor disadvantage with this arrangement is that if the diode 35 becomes short-circuited there will be no control of current flow to the winding 15. However, this difficulty can be overcome by including a fusible link 36 in series with the diode 35 as shown. The diode 35 and link 36 can be incorporated in the regulator between the terminals 18, 19, or in the generator between the terminals 11, 12.

In addition to the desirability of providing the link 36 in FIGURE 2, the circuit shown in FIGURE 1 has the advantage that the rating of the clipper diode in FIGURE 1 can be reduced as compared with the clipper diode in FIGURE 2. As an example, in a 12-volt system a 60-volt clipper diode could be used in FIGURE 2, whereas a 45-volt clipper diode would suffice in FIGURE 1.

In FIGURE 2 the clipper diode could be replaced by a Zener diode connected in the appropriate manner depending on whether a positive or negative earth system is used. The use of a clipper diode is preferred because the connection of the clipper diode is independent of which earth system is used.

The use of a clipper diode or Zener diode as described is found to give great improvement in contact life. In one example, contact life was increased by a factor of 10.

Having thus described our invention what we claim as new and desire to secure by Letters Patent is:

1. A battery charging system for a road vehicle, including a generator for charging the battery and a voltage regulator for limiting the output voltage of the generator by opening a pair of contacts in series with the generator field winding whenever the output voltage of the generator exceeds a predetermined value, the system further including a semi-conductor device which will conduct only when the voltage across it exceeds a predetermined value, said device being connected in the system in a position in which it limits the voltage developed across the pair of contacts.

2. A battery charging system for a road vehicle, comprising in combination a generator having an earth terminal, a live terminal and a field terminal, the armature being connected between the live and earth terminals and the field winding being connected between the field and earth terminals, and a voltage regulator having a first terminal connected to the live terminal, a second terminal connected to the field terminal, a third terminal which in use is earthed through the battery, a fourth terminal which in use is earthed, a normally closed pair of contacts through which the first and second terminals are interconnected, and a coil connected in a series circuit between the first and fourth terminals, said coil opening the pair of contacts when the output voltage of the generator exceeds a predetermined value, the system further including a semi-conductor device which will conduct only when the voltage across it exceeds a predetermined value, said device being connected in the system in a position in which it limits the voltage developed across the pair of contacts.

3. A system as claimed in claim 2 in which said device is connected across the field winding.

4. A system as claimed in claim 3 in which said device is connected between the field and earth terminals of the generator.

5. A system as claimed in claim 3 in which said device is connected between the second and third terminals of the voltage regulator.

6. A system as claimed in claim 2 in which said device is connected in a circuit across the pair of contacts.

7. A system as claimed in claim 6 in which said device is connected between the live and field terminals of the generator.

8. A system as claimed in claim 6 in which said device is connected between the first and second terminals of the voltage regulator.

9. A system as claimed in claim 2 in which said device is a clipper diode.

10. A system as claimed in claim 6 in which said device is a clipper diode having a fusible link in series therewith.

11. A system as claimed in claim 6 in which said device is a Zener diode having a fusible link in series therewith.

References Cited

UNITED STATES PATENTS

| 2,846,639 | 8/1958 | Read | 322—25 |
| 2,927,261 | 3/1960 | Mittag | 322—25 |
| 2,991,396 | 7/1961 | Schurr | 317—11 |

MILTON O. HIRSHFIELD, *Primary Examiner.*

J. D. TRAMMELL, *Assistant Examiner.*